US011628522B2

(12) United States Patent
Kottre et al.

(10) Patent No.: US 11,628,522 B2
(45) Date of Patent: Apr. 18, 2023

(54) HANDLING DEVICE FOR SERVICING A PISTON WITH A SMALL END ATTACHED TO THE PISTON VIA A PISTON PIN

(71) Applicant: MAN Energy Solutions SE, Augsburg (DE)

(72) Inventors: Ewald Kottre, Augsburg (DE); Mario Stegmayr, Altenmünster (DE)

(73) Assignee: MAN ENERGY SOLUTIONS SE, Augsburg (DE)

( * ) Notice: Subject to any disclaimer, the term of this patent is extended or adjusted under 35 U.S.C. 154(b) by 0 days.

(21) Appl. No.: 17/282,504

(22) PCT Filed: Sep. 19, 2019

(86) PCT No.: PCT/EP2019/075100
§ 371 (c)(1),
(2) Date: Apr. 2, 2021

(87) PCT Pub. No.: WO2020/069874
PCT Pub. Date: Apr. 9, 2020

(65) Prior Publication Data
US 2021/0354254 A1    Nov. 18, 2021

(30) Foreign Application Priority Data

Oct. 4, 2018    (DE) .................... 10 2018 124 456.8

(51) Int. Cl.
*B23P 6/02* (2006.01)
*B23P 19/04* (2006.01)
(Continued)

(52) U.S. Cl.
CPC .............. *B23P 6/02* (2013.01); *B23P 19/042* (2013.01); *B25H 1/0007* (2013.01); *B23Q 3/06* (2013.01); *B25H 1/10* (2013.01)

(58) Field of Classification Search
CPC ............. Y10T 29/53557; Y10T 29/536; Y10T 29/53974; Y10T 29/53983; B23P 19/04;
(Continued)

(56) References Cited

U.S. PATENT DOCUMENTS 3,218,056 A * 11/1965 Kaplan ................ B25H 1/0007
269/61
4,145,006 A * 3/1979 Webb ....................... B23Q 1/48
269/69

(Continued)

FOREIGN PATENT DOCUMENTS

CN    203566572 U    4/2014
CN    203875832      10/2014
(Continued)

OTHER PUBLICATIONS

Written Opinion of the International Searching Authority for International Application No. PCT/EP2019/075100 (dated 2021).*
(Continued)

*Primary Examiner* — Lee D Wilson
*Assistant Examiner* — Tyler James McFarland
(74) *Attorney, Agent, or Firm* — Cozen O'Connor

(57) ABSTRACT

A handling device for servicing a piston with a small end attached to the piston via a piston pin, having a basic frame, a receiving device that is pivotable or tiltable relative to the basic frame for the piston removed from an internal combustion engine, an actuator for pivoting or tilting the receiving device relative to the basic frame, and a locking device via which the receiving device is lockable on the basic frame in different pivot positions or tilting positions.

11 Claims, 6 Drawing Sheets

(51) Int. Cl.
  *B25H 1/00* (2006.01)
  *B25H 1/10* (2006.01)
  *B23Q 3/06* (2006.01)
  *B25B 11/00* (2006.01)

(58) Field of Classification Search
  CPC ........ B23P 19/042; B23P 19/043; B23Q 1/01;
    B23Q 1/012; B23Q 1/015; B23Q 1/25;
    B23Q 1/40; B23Q 1/42; B23Q 1/525;
    B23Q 1/62; B23Q 1/621; B23Q 1/626;
    B23Q 3/02; B23Q 3/062; B23Q 3/064;
    B25H 1/00; B25H 1/0007; B25H 1/08;
    B25H 1/10
  USPC ........................................ 29/281.5
  See application file for complete search history.

(56) References Cited

U.S. PATENT DOCUMENTS

| | | | | |
|---|---|---|---|---|
| 4,200,273 | A * | 4/1980 | Das Gupta | F01D 25/285 269/61 |
| 5,909,988 | A * | 6/1999 | Hoppe | B23Q 5/54 409/234 |
| 2004/0169167 | A1 | 9/2004 | Reinelt et al. | |
| 2012/0007298 | A1 | 1/2012 | Proietti | |
| 2016/0288282 | A1 | 10/2016 | Liu et al. | |

FOREIGN PATENT DOCUMENTS

| | | | |
|---|---|---|---|
| CN | 106493660 | | 3/2017 |
| CN | 207669267 | | 7/2018 |
| CN | 207669267 U | * | 7/2018 |
| CN | 207894390 | | 9/2018 |
| DE | 3135082 | | 3/1983 |
| DE | 102010041466 | | 3/2012 |
| JP | 2013-189885 | | 9/2013 |
| SU | 1274899 | | 12/1986 |
| WO | WO 8707198 | | 12/1987 |
| WO | WO 8707198 A1 | * | 12/1987 |

OTHER PUBLICATIONS

Office Action dated Oct. 6, 2021 issued in India Patent Application No. 202147014358.
Search Report dated Apr. 11, 2022 issued in German Patent Application No. 10 2018 124 456.8.
Office Action dated May 18, 2022 issued in Canadian Patent Application No. 3,109,241.
Office Action dated Jun. 23, 2022 issued in Chinese Patent Application No. 201980065548.5.
Office Action dated May 9, 2022 issued in Japanese Patent Application No. 2021-512898.

* cited by examiner

HANDLING DEVICE FOR SERVICING A PISTON WITH A SMALL END ATTACHED TO THE PISTON VIA A PISTON PIN

CROSS REFERENCE TO RELATED APPLICATIONS

This is a U.S. national stage of Application No. PCT/EP2019/075100 filed Sep. 19, 2019. Priority is claimed on German Application No. DE 10 2018 124 456.8 filed Oct. 4, 2018 the content of which is incorporated herein by reference.

BACKGROUND OF THE INVENTION

1. Field of the Invention

The disclosure relates to a handling device for servicing a piston with a small end attached to the piston via a piston pin.

2. Description of Related Art

During the maintenance of large internal combustion engines, such as for example marine diesel internal combustion engines, which comprise built connecting rods having multiple parts, it is usual to disassemble a piston with a small end attached to the piston via a piston pin from the internal combustion engine for servicing a piston and subsequently, for servicing, remove the piston pin and the small end from the piston and if required subsequently dismantle the piston into a piston upper part and a piston lower part. The handling of a piston with a small end attached to the piston via a piston pin has been carried out up to now in an undefined manner by placing the weighting piston onto a pallet, and by manually turning the piston into a position in which the various service steps are to be performed. In the process, the piston, piston pin or the small end can be damaged. Furthermore, the procedure is risky to service personnel since the service personnel can get seriously injured when handling such large heavy pistons.

SUMMARY OF THE INVENTION

There is a need for a handling device for pistons with a small end attached to the piston via a piston pin, with the help of which the piston can be safely handled for servicing.

One aspect of the present invention is a safe handling device for servicing a piston with a small end attached to the piston via a piston pin.

One aspect of the invention is a handling device for servicing a piston with a small end attached to the piston via a piston pin.

The handling device comprises a basic frame. Furthermore, the handling device comprises a receiving device for a piston removed from an internal combustion engine, which is pivotable or tiltable relative to the basic frame, to which piston via a piston pin a small end is attached.

Furthermore, the handling device comprises an actuator for pivoting or tilting the receiving device relative to the basic frame. Furthermore, the handling device comprises a locking device via which the receiving device can be locked on the base frame in different pivot positions.

The basic components of the handling device are the basic frame, the receiving device, the actuator and the locking device. By way of the handling device, a piston with the small end attached to the piston via the piston pin to be serviced can be securely and reliably handled and for this purpose transferred into defined service positions. There is no risk that the piston, piston pin or small end are damaged during the service or service personnel get injured during the service.

According to an advantageous further aspect of the invention, the basic frame comprises feet, cross members, side members, and bearing struts, wherein the cross members and side members lie in a horizontally extending plane, wherein the feet, relative to this plane, stand away in a first direction towards the bottom and the bearing struts relative to this plane stand away to the top in a second direction, and wherein the receiving device is pivotably or tiltably mounted on the bearing struts. Such a basic frame is particularly preferred. The cross members, side members, feet, and bearing struts are preferentially embodied as plug profiles and plugged into one another. The working height on the handling device can be adjusted by way of the height of the feet. By way of the receiving device, which is pivotable or tiltable on the bearing struts, the piston can be pivoted or tilted into defined service positions.

According to an advantageous further aspect of the invention, the receiving device comprises a base plate which via pivot arms acts on the bearing struts, wherein the receiving device furthermore comprises spindles acting on the base plate and a clamping bridge acting on the spindles, wherein a piston, to which a small end is attached via a piston pin, can be down on the base plate and clamped via the spindles and the clamping bridge between base plate and clamping bridge. Such a receiving device, in which the piston to be handled is clamped between the base plate and the clamping bridge, is particularly preferred in order to securely hold the piston in the different pivot positions or tilting positions and exclude damaging the same as well as a risk of injury to service personnel.

According to an advantageous further aspect of the invention, the handling device comprises an adapter interacting with the base plate of the receiving device, which can be positioned in a defined pivot position or tilting position of the receiving device on the base plate, in order to hold the small end in the piston with the piston pin disassembled. By way of the adapter, the small end with disassembled piston pin can be secured against falling out of the piston. This allows a secure handling of piston and small end with disassembled piston pin.

According to an advantageous further aspect of the invention, the actuator comprises a self-locking gear that is manually actuatable via a hand wheel, which gear self-lockingly holds the receiving device in any desired pivot position or tilting position. The actuator allows safely moving the receiving device relative to the basic frame into different pivot positions or tilting positions. Because of the fact that the actuator of the handling device comprises a self-locking gear there is no risk that on letting go of the hand wheel the receiving device moves relative to the basic frame in an undefined or spontaneous manner. The safety is also increased by this.

According to an advantageous further aspect of the invention, the locking device comprises a locking pin, wherein the receiving device is pivotable or tiltable with the help of the actuator relative to the basic frame exclusively with disengaged locking pin. In defined pivot positions or tilting positions, the locking pin of the locking device secures the receiving device on the basic frame. The safety during the handling of the piston, piston pin and small end is also increased by this.

Preferred further developments of the invention are obtained from the subclaims and the following description.

BRIEF DESCRIPTION OF THE DRAWINGS

Exemplary embodiments of the invention are explained in more detail by way of the drawing without being restricted to this. There it shows.

DETAILED DESCRIPTION OF THE PRESENTLY PREFERRED EMBODIMENTS

The disclosure relates to a handling device employed during the service of a piston with a small end attached to the piston via a piston pin, and to a method for servicing such a piston using the handling device according to one aspect of the invention. The piston to be serviced and handled via the handling device is a piston of a large internal combustion engine, such as for example a marine diesel internal combustion engine. Such a piston is typically embodied as a built piston consisting of a piston lower part and a piston upper part. Such a piston is mounted on a crankshaft via a built connecting rod, wherein the connecting rod is formed of a small end, a connecting rod body and a big end. The small end serves for connecting the connecting rod to the piston. The big end serves for connecting the connecting rod to the crankshaft. The connecting rod extends between small end and big end.

Figure 1:
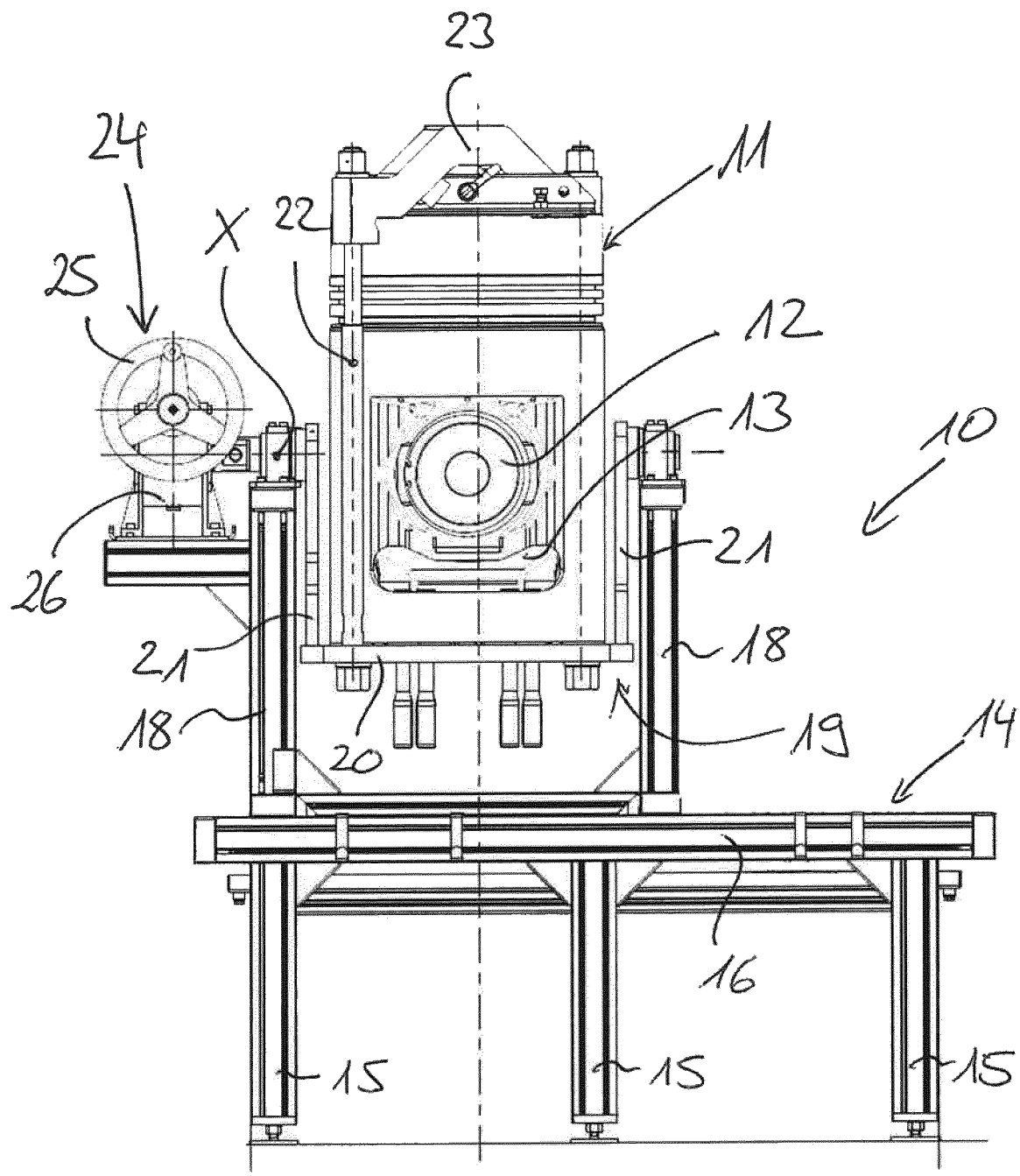
FIG. 1: is a lateral view of a handling device together with a piston to be serviced, with a small end attached to the piston via a piston pin in a first state of the handling device.
Figure 2:
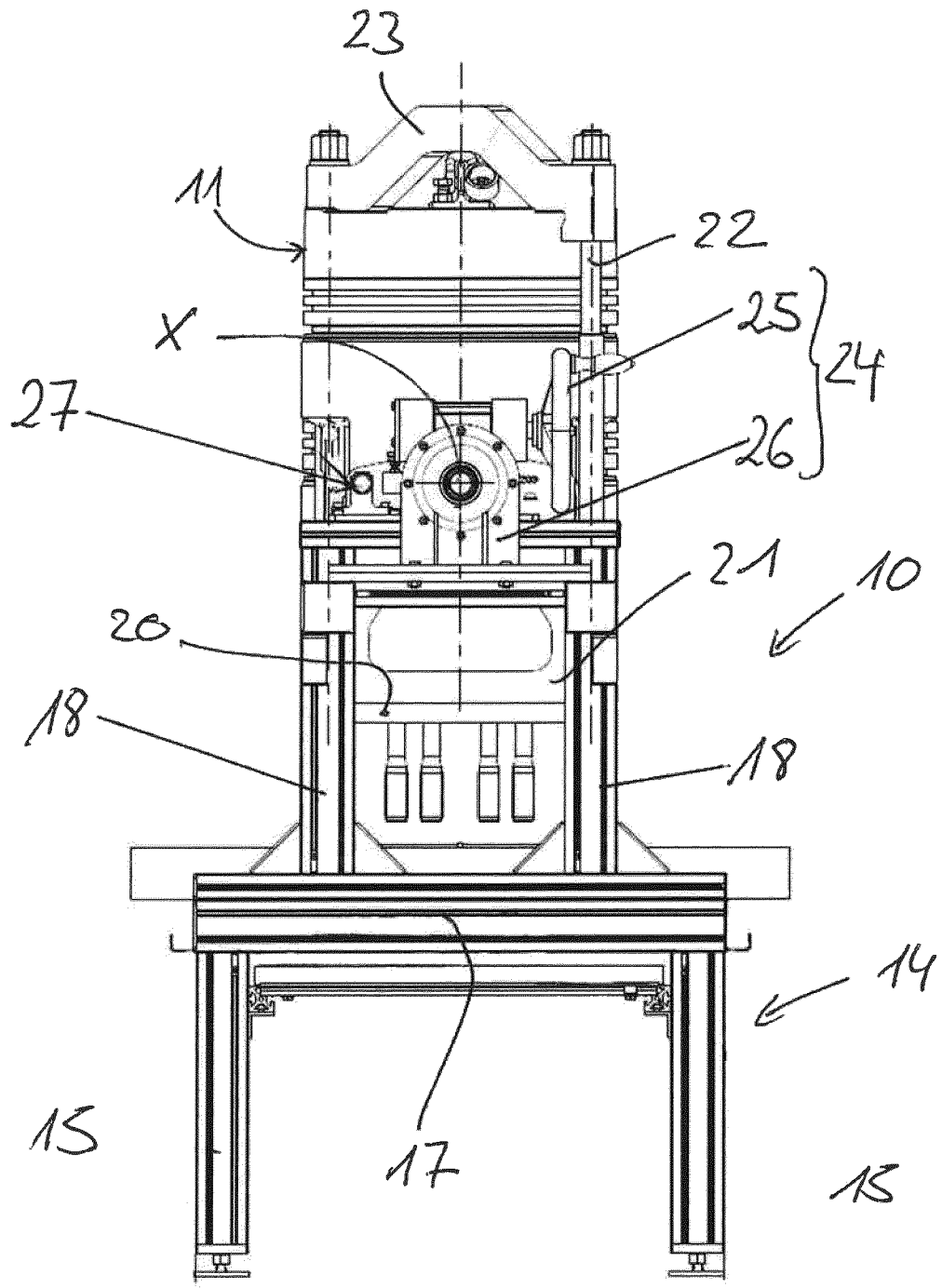
FIG. 2: is a lateral view of FIG. 1 rotated by 90° relative to FIG. 1.

FIGS. 1 and 2 show different views of a handling device 10 for servicing a piston according to one aspect of the invention, on which via a piston pin a small end is attached, namely together with a piston 11 to be serviced by the handling device, to which via a piston pin 12 a small end 13 is attached. As already explained, this piston 11 is a piston of a large internal combustion engine such as for example a marine diesel internal combustion engine.

The handling device 10 comprises a basic frame 14. The basic frame 14 comprises feet 15, side members 16, cross members 17, and bearing struts 18. The side members 16 and cross members 17 run in a horizontally extending plane or define this plane, wherein the feet 15, relative to this plane, stand away in a first direction downwards and the bearing struts 18, relative to this plane, stand away in a second direction towards the top. The height of the feet 15 determines the distance of the plane defined by the side members 16 and cross members 17 and thereby ultimately the working height of the handling device 10. The basic frame 14, namely the feet 15, the cross members 16, the side members 17, and the bearing struts 18 are preferentially formed as plug profiles that can be simply plugged into one another.

The handling device 10, furthermore, comprises a receiving device 19 for a piston 11 to be serviced with a small end 13 mounted to the piston 11 via the piston pin 12, wherein the receiving device 19 is pivotable or tiltable relative to the basic frame 14, in order to thereby ultimately transfer the piston 11 received by the receiving device 19 into defined positions or tilting positions for different service steps. Here, the receiving device 19 comprises a base plate 20. The base plate 20 of the receiving device 19 is pivotably or tiltably mounted on the bearing struts 18 of the basic frame 14 via pivot arms 21, wherein in FIG. 1 a pivot axis or tilting axis of the receiving device 19 relative to the basic frame 14 is marked by X in a schematised manner. In addition to the base plate 20 and the pivot arms 21, the receiving device 19 comprises spindles 22 acting on the base plate 20 and a clamping bridge 23 acting on the spindles 22. A piston 11, which is positioned on the base plate 20 of the receiving device 19, and on which the small end 13 is mounted via the piston pin 12, can be clamped between the base plate 20 and the clamping bridge 23 in the region of the receiving device 19, in particular by tightening the spindles 22.

The handling device 10, furthermore, comprises an actuator 24 for pivoting or tilting the receiving device 19 relative to the basic frame 14. Here, the actuator 24, in the shown preferred exemplary embodiment, comprises a hand wheel 25 and a self-locking gear 26. By actuating the hand wheel 25, the receiving device 19 can be manually tilted or pivoted relative to the basic frame 14, wherein, as explained above, the self-locking gear 26 is connected between the hand wheel 25 and the pivot axis 21. In particular when a person working on the handling device lets go of the hand wheel 25, the relative pivot position or tilting position of the receiving device 19 is self-lockingly secured relative to the basic frame 14 by way of the self-locking gear 26. An unintentional moving of the receiving device 19 or of the piston 11 received on the receiving device 19 relative to the basic frame 14 is thus prevented.

Besides the basic frame 14, the receiving device 19 and the actuator 24, the handling device 10, furthermore, comprises a locking device 27. By way of the locking device 27, which in the shown exemplary embodiment is embodied as locking pin or comprises a locking pin, the receiving device 19 is lockable on the basic frame 14 in different pivot positions or tilting positions.

The receiving device 19 or a piston 11 clamped on the receiving device 19 is pivotable or tiltable relative to the basic frame 14 with the help of the actuator 24 only in particular when the locking pin or the locking device 27 is disengaged or unlocked. With locked locking device 27, by contrast, the receiving device 19 cannot be tilted or pivoted relative to the basic frame 14.

FIGS. 1 and 2 show the handling device 10 in a first pivot position or tilting position of the receiving device 19, in which the base plate 20 of the same is directed downwards or facing the feet 15 of the basic frame 14. In this relative position of the receiving device 19, a piston 11 disassembled from an internal combustion engine, which the small end 13 is attached via the piston pin 12, can be put down on the base plate and clamped via clamping bridge 23 and the spindles 22 between base plate 20 and clamping bridge 23.

Figure 3:
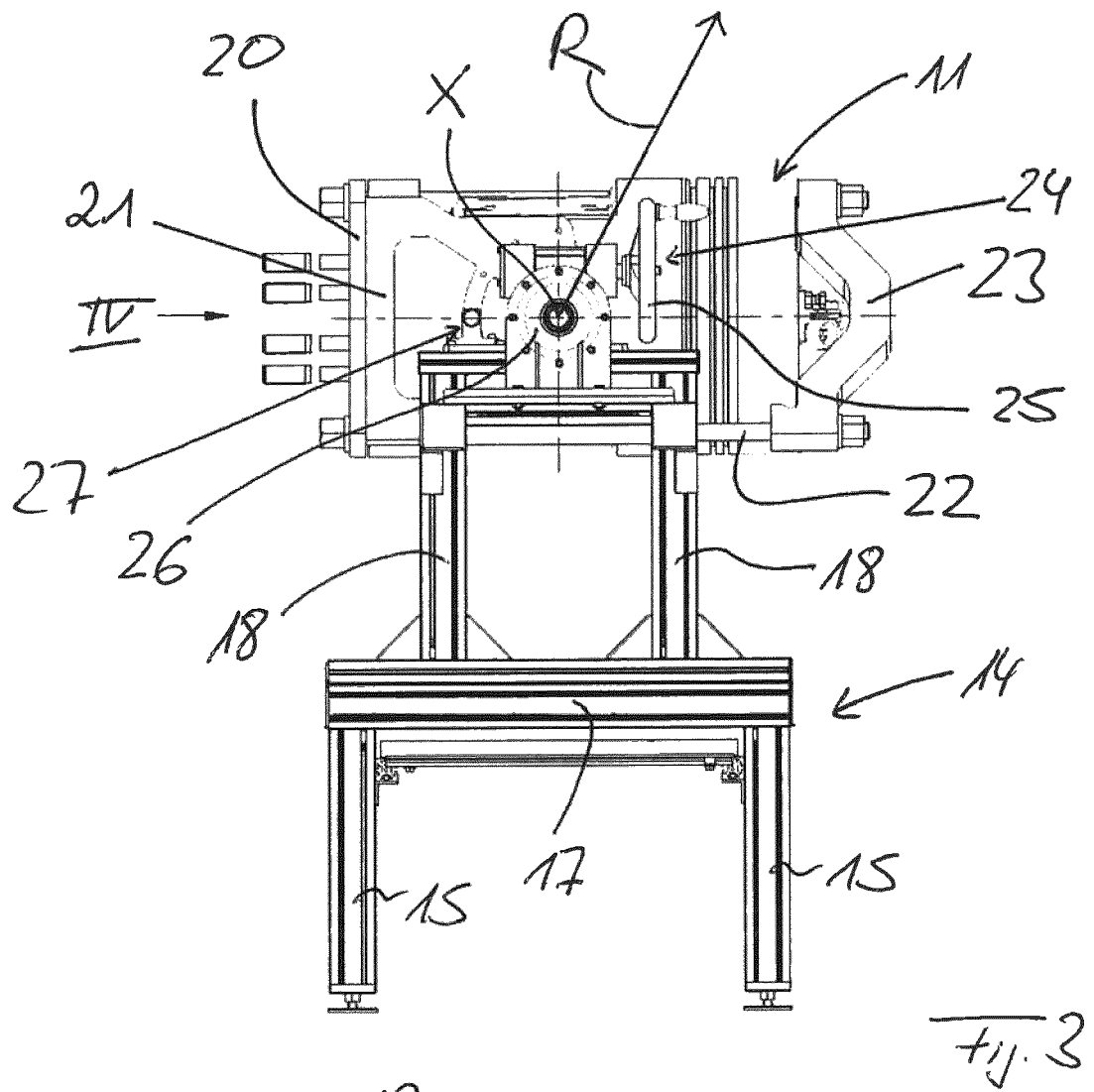
FIG. 3: is the lateral view of FIG. 2 in a second state of the handling device.

By actuating the actuator 24, the receiving device 19, following the releasing of the locking device 27, together with the piston 11 received and clamped on the receiving device 19, can be moved relative to the basic frame 14, namely for example into the pivot position or tilting position shown in FIG. 3, in which relative to FIGS. 1 and 2, the piston 11 is moved by 90° relative to the basic frame 14. An arrow R visualises the range within which the piston 11 or the receiving device 19 can move together with the piston during the pivoting or tilting.

Figure 5:
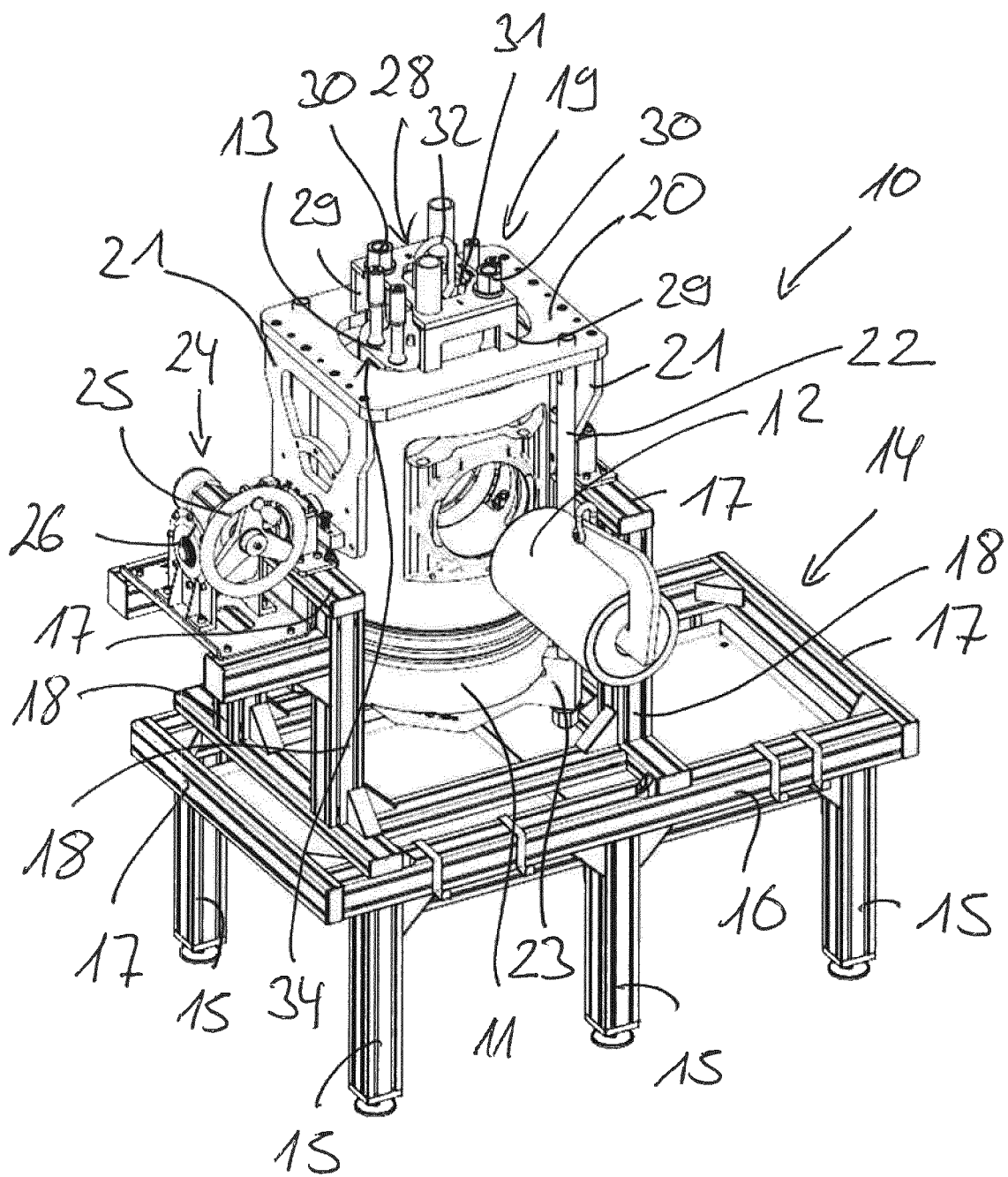
FIG. 5: is a perspective view of the handling device in a third state of the handling device.

In the representation of FIG. 5, the receiving device 19 together with the piston 11 is further tilted or pivoted relative to the basic frame 14 with the help of the actuator 24, namely by a further 90° in such a manner that compared with the pivot position or tilting position of FIGS. 1 and 2, the receiving device 19 together with the piston 11 clamped to the receiving device 19 stands upside down, wherein in all relative positions or tilting positions or pivot positions of FIGS. 1, 2, 3 and 5, the receiving device 19 can be locked via the locking device 27.

The handling device 10 according to one aspect of the invention, furthermore, comprises an adapter 28 interacting with base plate 20 of the receiving device 19. In particular when the receiving device 19 assumes the relative position or tilting position or pivot position of FIG. 5, the adapter 28 can be positioned on the base plate 20, which adapter 28 supports itself on the base plate 20 via projections 29. The small end 13 can be mounted to this adapter 28 by way of screws 30.

In particular when in the pivot position or tilting position of FIG. 5 the piston pin 12 is disassembled from the piston 11, the small end 13 can support itself on the base plate 20 of the receiving device 19 via the adapter 28, so that the said small end 13 can then be secured against falling out of the piston 11.

Figure 4:
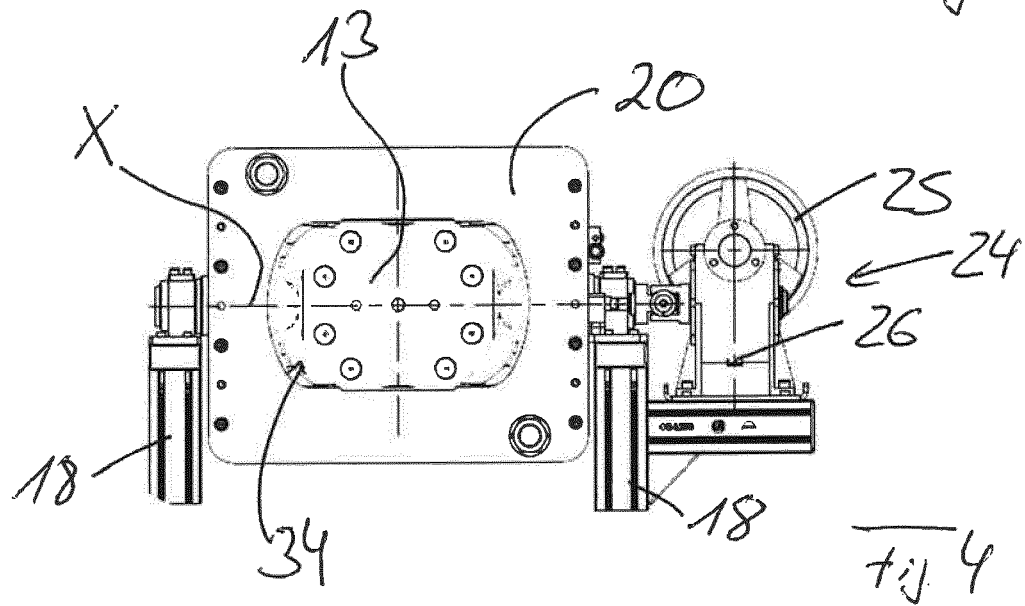
FIG. 4: is detail IV of FIG. 3.
Figure 6:
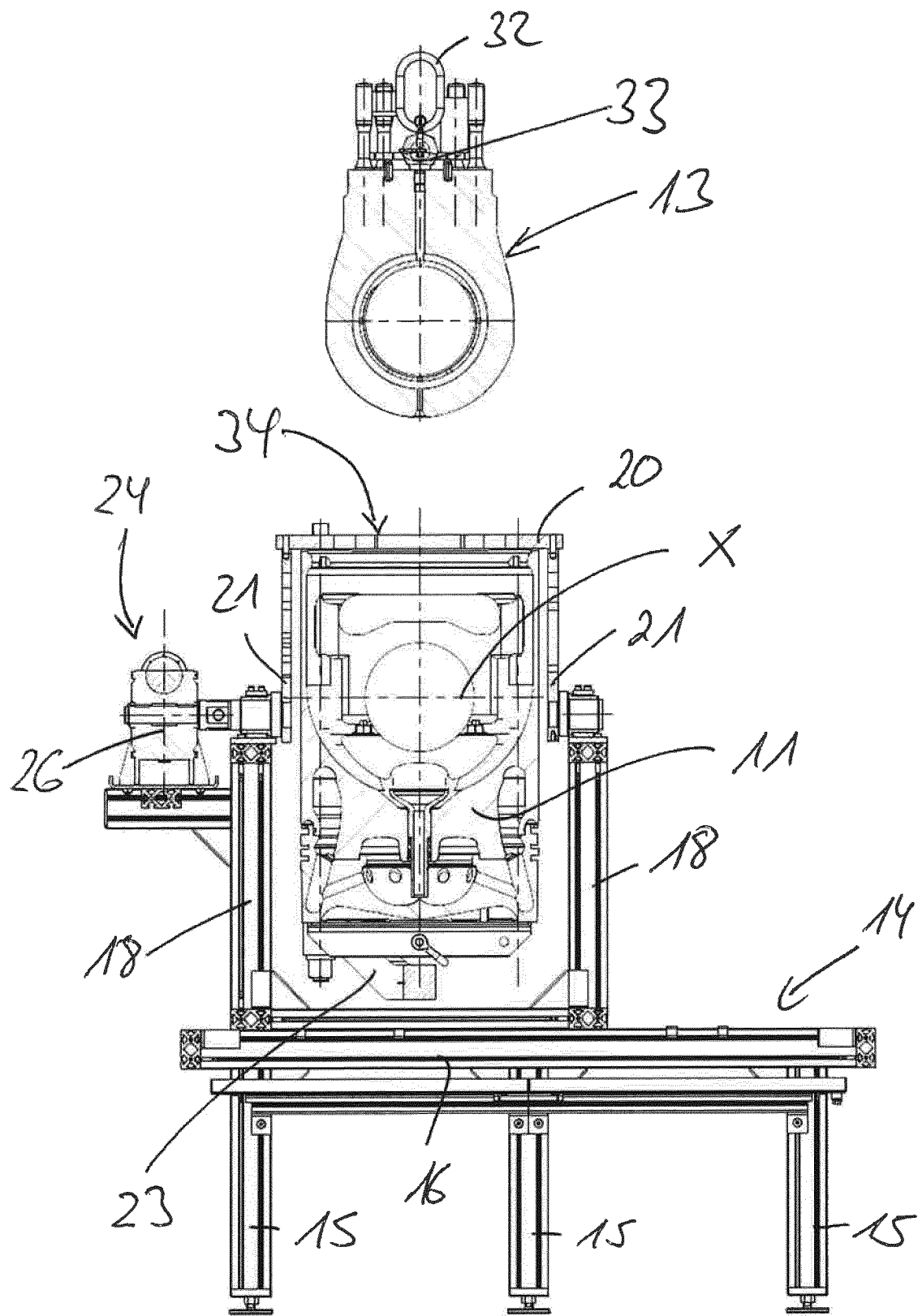
FIG. 6: is the lateral view of FIG. 1 in the third state of the handling device with disassembled small end.
Figure 7:
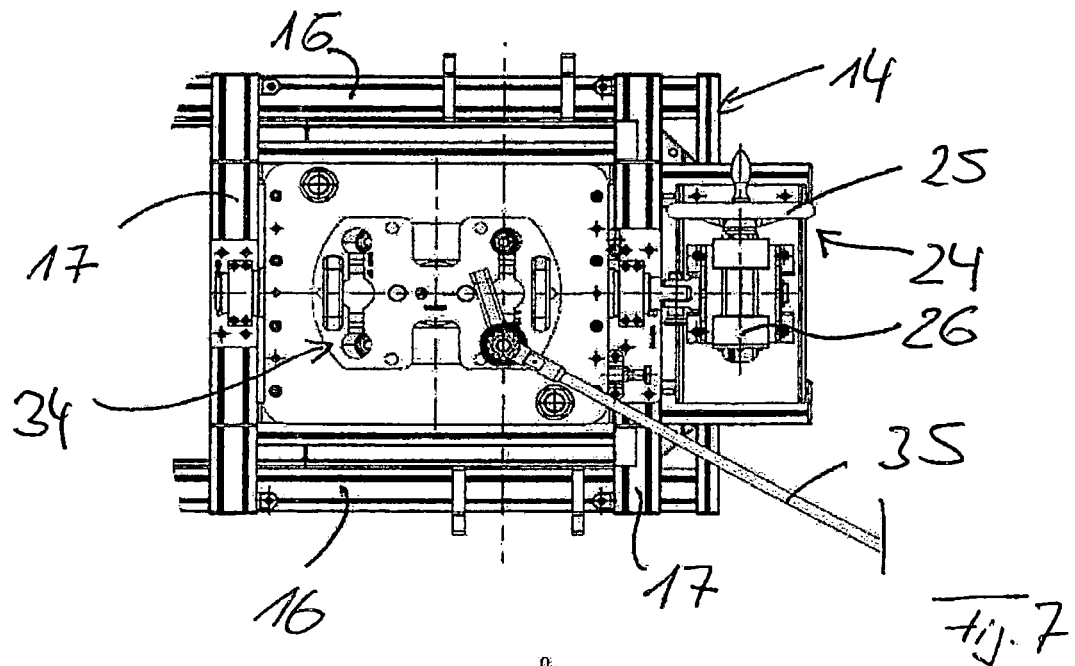
FIG. 7: is a plan view of FIG. 6 without small end.

In the adapter 28 an opening 31 is introduced through which a fastening hook 32 can extend, wherein this fastening hook 32 is screwed to the small end 13 via a ring bolt 33. In particular when the receiving device 19 of the handling device 10 assumes the relative position or tilting position or pivot position shown in FIG. 5, the piston pin 12 is disassembled and the small end 13 supports itself on the base plate via the adapter 28, the entire small end 13 can be removed from the piston 11 by pulling on the fastening hook 32, namely by way of a recess 34 introduced into the base plate 20. This recess 34 is best visible in FIGS. 4, 5. FIG. 6 shows the handling device 10 together with the piston 11 in the relative position of the receiving device 19 according to FIG. 5, wherein however in FIG. 6 the small end 13 is lifted out of the piston 11.

After the small end 13 has been lifted out of the piston 11 (see FIG. 6), the recess 34 of the base plate 20 serves as access opening for a tool 35, which the help of which in the case of a built piston 11a screw connection between a piston upper part 11a and a lower part 11b (see FIG. 8) can be disconnected.

Figure 8:
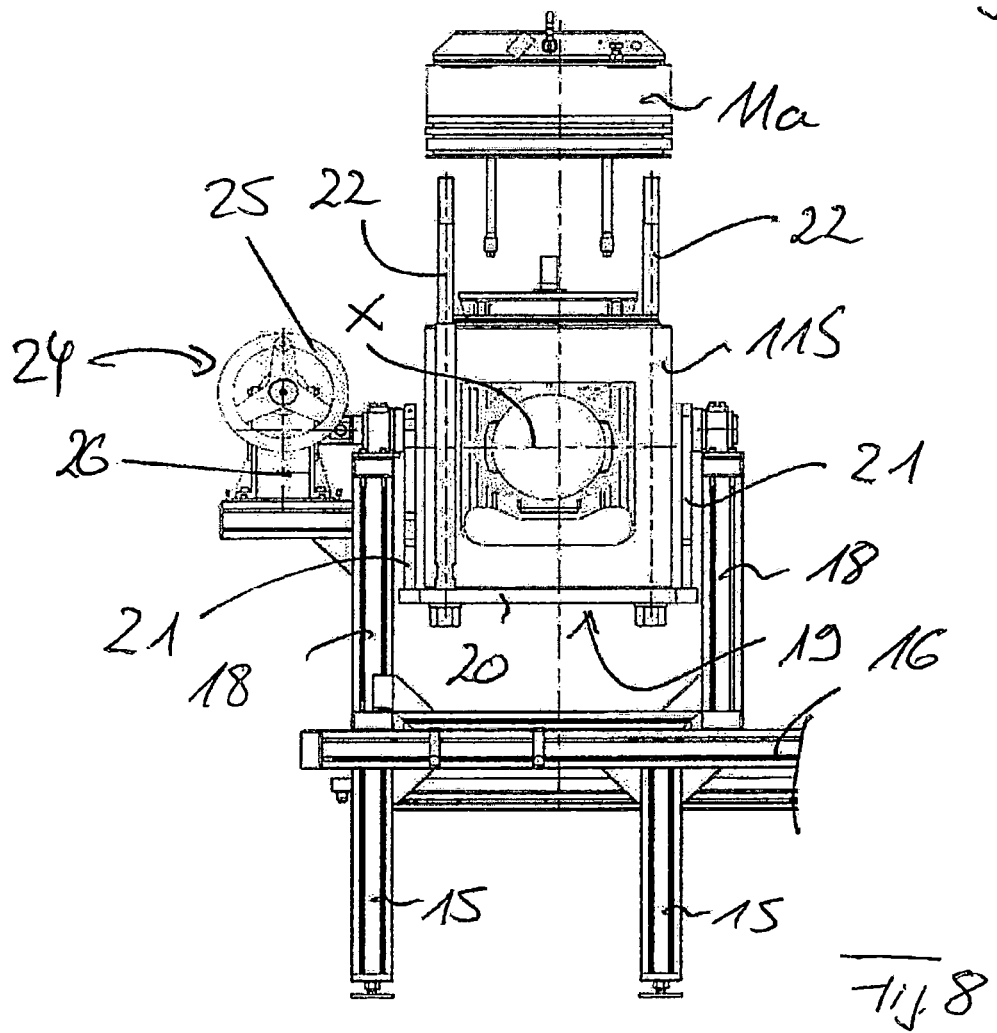
FIG. 8: is a lateral view of FIGS. 2, 3 in the first state of the handling device with disassembled piston.

Following the disconnecting of the screw connection of piston upper part 11a and lower part 11b, following the transferring of the receiving device 19 back into the first tilting position or pivot position of FIGS. 1, 2 and following the releasing of the clamping bridge 23, the piston upper part 11a can then be lifted off the piston lower part 11b according to FIG. 8.

In order to service a piston with the help of the handling device 10 according to one aspect of the invention, the piston 11 to be serviced together with the small end 13 mounted to the piston 11 via a piston pin 12 is initially removed from a corresponding cylinder of an internal combustion engine.

Following this, the piston 11 together with the small end 13 mounted to the piston 11 via the piston pin 12 is arranged and clamped on the receiving device 19 of the handling device 10, namely in the pivot position or tilting position of the receiving device 19 of FIGS. 1 and 2. In the process, the piston 11 is arranged on the base plate 20 of the receiving device 19 and clamped via the clamping bridge 23 and the spindles 22 between base plate 20 and clamping bridge 23 of the receiving device 19.

In order to now transfer the piston 11 together with the small end 13 mounted to the piston 11 via the piston pin 12 into a defined relative position for service operations, the receiving device 19 is transferred with the help of the actuator 24, with unlocked locking device 27, into a pivot position or tilting position defined for a service to be carried out or a service step to be carried out.

In the respective pivot position or tilting position, the locking device 27 is locked for carrying out the respective service step in order to thereby lock the receiving device 19 in the respective pivot position or tilting position on the basic frame 14.

Following the tilting or pivoting of the receiving device 19 from the position shown in FIGS. 1 and 2 into the position shown in FIGS. 5 and 6 and following the attaching of the adapter 28 to the small end 13 and to the base plate 20 of the receiving device 19, the piston pin 12 can be removed. Following this, the small end 13 can be removed in order to subsequently detach piston upper part 11a and piston lower part 11b as per FIG. 8.

The invention present here makes possible and entirely new and safe handling of a piston of a large internal combustion engine, such as for example a marine diesel internal combustion engine when performing service operations on the piston.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A handling device for servicing a piston having a small end attached to the piston via a piston pin, comprising: a basic frame having bearing struts; a receiving device that is pivotable or tiltable relative to the basic frame via the bearing struts for the piston removed from an internal combustion engine, the receiving device comprises: a base plate, which acts on the bearing struts via pivot arms; at least two spindles each having a first end coupled to the base plate and a second end opposite the first end; and a clamping bridge coupled to a respective second end of each of the spindles, wherein the piston can be put down on the base plate and axially clamped via the spindles and the clamping bridge between the base plate and the clamping bridge; an actuator that pivots or tilts the receiving device relative to the basic frame; and a lock configured to lock the receiving device on the basic frame in different pivot positions or tilting positions.

2. The handling device according to claim 1, wherein the basic frame comprises:

feet;
cross members;
side members; and
the bearing struts,
wherein the cross members and side members lie in a plane that is horizontally extending,
wherein the feet, relative to the plane, stand away downwards in a first direction and the bearing struts stand away upwards relative to the plane in a second direction.

3. The handling device according to claim 1, wherein the basic frame further comprises a holder configured to hold the piston pin to separate the small end from the piston.

4. The handling device according to claim 1, wherein the actuator comprises a self-locking gear that is manually actuatable via a hand wheel, the self-locking gear self-lockingly holds the receiving device in any desired pivot position or tilting position.

5. The handling device according to claim 1, wherein the lock comprises:
a locking pin,
wherein the receiving device is pivotable or tiltable relative to the basic frame by the actuator exclusively with the locking pin disengaged.

6. The handling device according to claim 1, further comprising:
an adapter interacting with the base plate,
wherein the adapter is positionable in a defined pivot position or tilting position of the receiving device on the base plate to hold the small end in the piston with the piston pin removed.

7. The handling device according to claim 6,
wherein the base plate of the receiving device defines a recess,
wherein the small end held by the adapter can be removed from the piston using the recess.

8. The handling device according to claim 7, wherein the recess of the base plate, with the small end removed, serves as access for a tool for disassembling the piston into a piston upper part and a piston lower part.

9. The handling device according to claim 1, wherein a longitudinal axis of at least two spindles is perpendicular to an axis about which the receiving device pivots or tilts.

10. A method for servicing a piston with a small end attached to the piston via a piston pin with a handling device, comprising:
removing the piston from an internal combustion engine;
arranging and clamping the piston on a receiving device of a handling device, wherein the receiving device assumes a defined pivot position or a defined tilting position relative to a basic frame, which is locked via a lock;
unlocking the lock;
pivoting or tilting the receiving device with an actuator into a service pivot position or a service tilting position defined for a service to be carried out;
locking the lock in the service pivot position or the service tilting position and performing the respective service,
coupling at least two spindles to a base plate each having a first end coupled to the base plate and a second end opposite the first end;
coupling a clamping bridge to the second end of each of the spindles;
putting the piston down on the base plate; and,
clamping the piston via the at least two spindles and clamping bridge between the base plate and a clamping bridge.

11. The method according to claim 10,
wherein in the defined pivot position or the defined tilting position of the receiving device, in which the piston is arranged and clamped on the receiving device, a base plate of the receiving device is directed downwards or facing feet of the basic frame, and
wherein in the defined pivot position or the defined tilting position of the receiving device, in which the piston pin and the small end can be disassembled from the piston, the base plate of the receiving device is directed upwards or facing away from the feet of the basic frame.

* * * * *